VOLTAGE-CONTROLLED ONE-SHOT

Filed Sept. 14, 1971 2 Sheets-Sheet 1

INVENTOR,
CHARLES W. RAGSDALE
BY Harry M. Saragovitz
Edward J. Kelly
Herbert Berl
Saul Elbaum
ATTORNEYS INVENTOR,
CHARLES W. RAGSDALE
BY Harry M. Saragovitz
Edward J. Kelly
Herbert Berl
Saul Elbaum
ATTORNEYS 3,718,827

VOLTAGE-CONTROLLED ONE-SHOT

Charles W. Ragsdale, Laramie, Wyo., assignor to the United States of America as represented by the Secretary of the Army Filed Sept. 14, 1971, Ser. No. 180,297
Int. Cl. H03k 3/26
U.S. Cl. 307—273 3 Claims

ABSTRACT OF THE DISCLOSURE

A monostable multivibrator which has two inputs. The first input is for trigger pulses which determine the operating frequency of the circuit. A second input applies a pulse-width control voltage to the circuit. Upon coincidence of the two inputs, an output signal is produced which exhibits a reciprocal relationship between the output pulse width and the applied control voltage.

The invention described herein may be manufactured, used and licensed by and for the United States Government for governmental purposes without the payment to us of any royalty thereon.

FIELD OF THE INVENTION

The present invention relates to monostable multivibrators and more particularly to such a circuit which is voltage controlled. The disclosed invention exhibits a reciprocal relationship between the width of a generated output pulse and an applied control voltage.

SUMMARY OF THE PRIOR ART

A basic circuit in pulse and digital applications is known as a monostable multivibrator or one-shot. This type of circuit assumes a first voltage state during a normal steady state condition. However, upon the application of a trigger input pulse, the circuit switches its state so that a second output voltage is produced momentarily until the circuit returns itself to its initial steady state. Often, these circuits are employed as impulse generators to form narrow pulse signals that are employed as triggers for other connected bistable circuits.

In various applications, such as detector circuits, it is desirable to employ a circuit which is capable of exhibiting a reciprocal relationship between the pulse width of an output signal and a control voltage applied to the circuit input. At the present time, fairly elaborate circuitry is required to achieve this function. Prior circuits can be considered as pulse modulators because the output pulse width is varied as a function of input control voltage. Due to the elaborate nature of prior art pulse modulators, an unnecessary number of components must be employed, which decreases the reliability of the circuitry. Further, the extensive number of components necessitates a cost factor which proves disadvantageous.

SUMMARY OF THE PRESENT INVENTION

The present invention includes a multivibrator of the astable type which has a trigger input and a control voltage input. Upon coincidence of these inputs, an output pulse is produced which has a width inversely related to the control voltage. By detecting the width of the output pulse, information regarding the control voltage amplitude can be ascertained. The circuit includes reliable solid state devices which are capable of operating at a relatively high frequency.

BRIEF DESCRIPTION OF THE DRAWINGS

The above-mentioned objects and advantages of the present invention will be more clearly understood when considered in conjunction with the accompanying drawings, in which.

DESCRIPTION OF THE INVENTION

Figure 1:
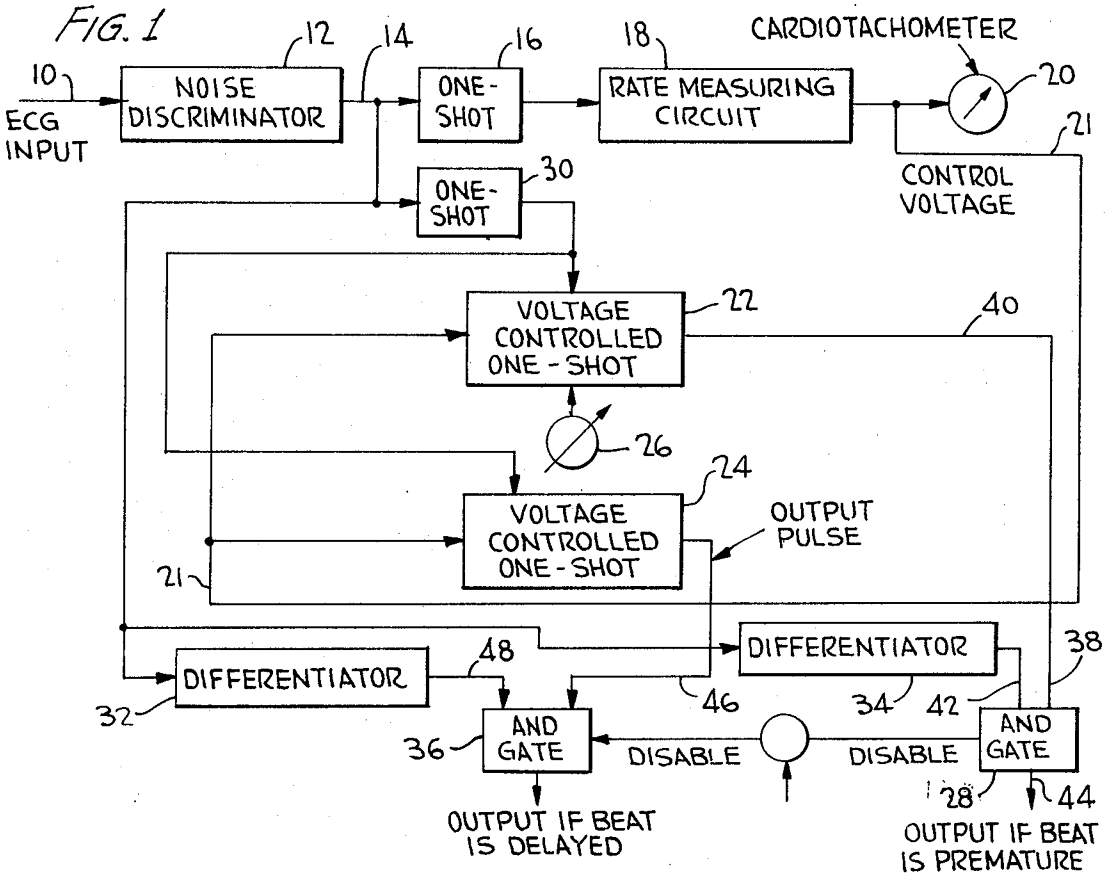
FIG. 1 is a block diagram illustrating the utilization of the present invention in a premature and delayed beat detector.

In order to fully appreciate the present invention, part of a ventricular-contraction recognition system will be discussed. The present invention which is a voltage controlled one-shot forms a part of this system. However, the overall system is not the claimed subject matter of the present invention.

Part of a ventricular contraction recognition system has been devised which will recognize the occurrence of premature and delayed beats (which system would be part of a system to recognize premature ventricular contractions (PVC's)). Such a system is a useful adjunct to present coronary care equipment since the occurrence of PVC's often precedes dangerous arrhythmias that can lead to ventricular fibrillation and death. Early warnings of PVC's would allow the use of drugs or other medical procedures that can prevent more dangerous cardiac states from occurring.

A PVC is a rhythm disturbance of the heart that typically occurs in almost all of us at one time or another. However, they have ominous significance when the frequency or other chraracteristics of their occurrence meet certain criteria. A PVC usually results in reduced cardiac output, and this can be very dangerous in a heart that is weak or has been damaged as a result of disease or injury.

A PVC can be recognized in an electrocardiogram (ECG); the reasons for their occurrence include:

(1) Chemical disturbances, (2) Interference in the conduction of electrical impulses in the heart due to a myocardial infarction (part of the heart muscle dies), myocardial ischemia (heart muscle is injured), or blockage of the heart's specialized conduction system (e.g., bundle-branches), and (3) External stimulus due to electrical shock or mechanical disturbance (e.g., touching the heart with a catheter tip).

Whatever the reason, the occurrence of consecutive and/or frequent PVC's is usually a danger sign. For example, if a PVC occurs at the right time during the cardiac cycle, the heart can be triggered into ventricular fibrillation which leads to death.

The normal cardiac cycle involves, in the order of occurrence, the initiation of an impulse by the sino-atrial node (pacemaker), conduction through and contraction of the atria, propagation delay by the atrial-ventricular (A-V) node, and finally, contraction of the ventricles.

Although a PVC can be determined by the observation of the electrocardiogram (ECG), its occurrence is usually infrequent at first, and this makes positive detection difficult without constant vigil by trained personnel. Usually, medical personnel cannot keep a constant vigil, and a more serious condition can develop. An automatic PVC recognition and recording system would alert personnel to the necessity of monitoring the ECG or administering therapy.

With the typical nondiseased patent, the ECG complex occurs regularly through some rate variation when breathing is normal. However, the typical cardiac conduction cycle is sometimes interfered with, and an impulse originates at an improper site in the heart. This impulse can cause the heart or part of the heart to contract at the wrong time (usually prematurely), and the site of the initiation of contraction is called an ectopic focus. Any cardiac contraction that is initiated by the ectopic focus is called an ectopic beat. When an ectopic focus in the ventricles causes a premature beat, a PVC is said to occur.

One of the first considerations for the discussed system is the measurement of premature and delayed heartbeats. FIG. 1 illustrates a premature and delayed beat detector which accomplishes the desired measurement.

An ECG input signal is applied at input line 10 of a noise discriminator 12. The input signal on line 10 is filtered, amplified, rectified, and gain controlled. Typically, the signal is derived from a biological preamplifier. The output line 14 from the noise discriminator 12 drives a one-shot 16 otherwise referred to as a monostable multivibrator. This one-shot produces a 200 msec. blanking pulse which permits triggering rates, by the noise discriminator, of 300 beats per minute. The blanking pulse further provides rejection of additional noise signals such as ECG T-waves that might not have been rejected by the noise discriminator. The output of one-shot 16 drives a rate-measuring circuit 18 that produces an output voltage which is linearly dependent upon the average rate-of-occurrence of the 200 msec. pulses. This voltage appearing at the output of circuit 18 drives a series connected cardiotachometer 20 which indicates the average heart rate being measured. The output from the rate measuring circuit 18 is also connected to a control voltage line 21 that is connected in parallel with two voltage controlled one-shots 22 and 24. The latter mentioned voltage controlled one-shots form the particular subject matter of the claimed invention. The control voltage appearing on line 21 serves to control output pulse width of the one-shots 22 and 24. The average time between regularly occurring heartbeats is reciprocally related to their average rate of occurrence, and the circuitry of each one-shot 22, 24 incorporates a reciprocal relationship between control voltage and output pulse width. However, the output pulses of the one-shots 22, 24 are directly proportional to the expected time between pulses as determined by the average heart rate.

Foro each heart beat (assuming a steady, regular rate to exist), the 10 msec. one-shot 30 would trigger, and at the end of its 10 msec. pulse, cause both one-shots 22 and 24 to produce an output pulse. The first one-shot 22 produces a pulse that is either 60 or 90 percent of the expected time between ECG peaks, based on the average heart-rate calculation. The percentage is selected by a selector switch 26. However, as long as a noise discriminator output does not occur within the selected time following the previous noise discriminator output, AND gate 28 will not have an output. The 10 msec. one-shot 30 has its input terminal connected to the noise discriminator output line 14. Connected in parallel with this output line are the input terminals of differentiators 32 and 34. The 10 msec. one-shot delays the triggering of the one-shots 22 and 24, and the differentiators produce an output spike of less than 10 msec. duration. This assures that the first noise discriminator pulse that finds the one-shots 22 and 24 untriggered will not cause the AND gates 28 and 36 (discussed hereinafter) to open for a brief time.

Referring to AND gate 28, the input terminal 38 is connected to the output pulse line 40. The second input terminal 42 of AND gate 28 is connected to the output of differentiator 34. As indicated in FIG. 1, the output 44 of AND gate 28 becomes actuated if the beat is premature. In the case of AND gate 36, the input line 46 is connected to the output of the second voltage controlled one-shot 24. The second input line 48 is connected between the input of AND gate 36 and the output terminal of the differentiator 32.

If the noise discriminator 12 has an output produced which occurs during the time that the first one-shot 22 is on, AND gate 28 will open and this will indicate that the heart beat is premature. The voltage controlled one-shot features, which allows retriggering during its cycle, permits consecutive premature beats to be sensed until the average rate indication changes and causes the voltage controlled one-shots 22 and 24 to have decreased pulse widths.

On the other hand, AND gate 36 produces an output if an output from the noise discriminator 12 occurs after the end of the pulse from the second voltage controlled one-shot 24. This would mean that the heart beat measured is delayed.

Figure 2:
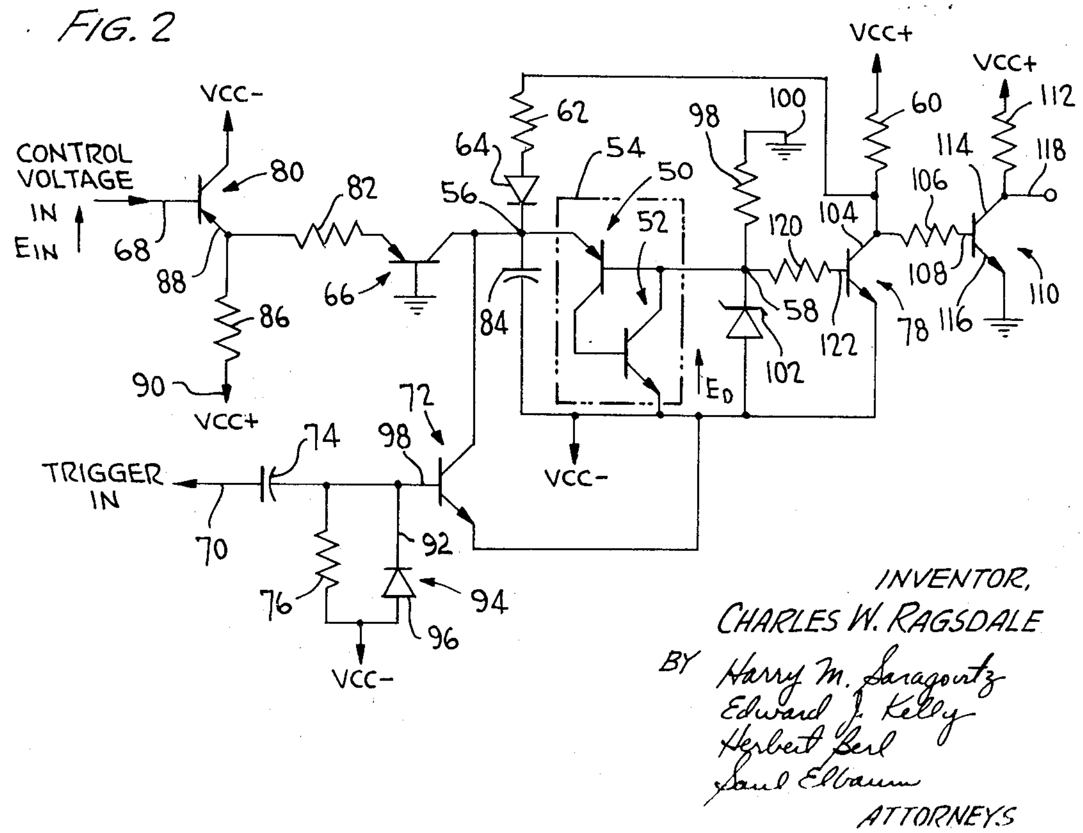
FIG. 2 is a circuit diagram of a voltage controlled one-shot circuit which forms the present invention.
Figure 3:
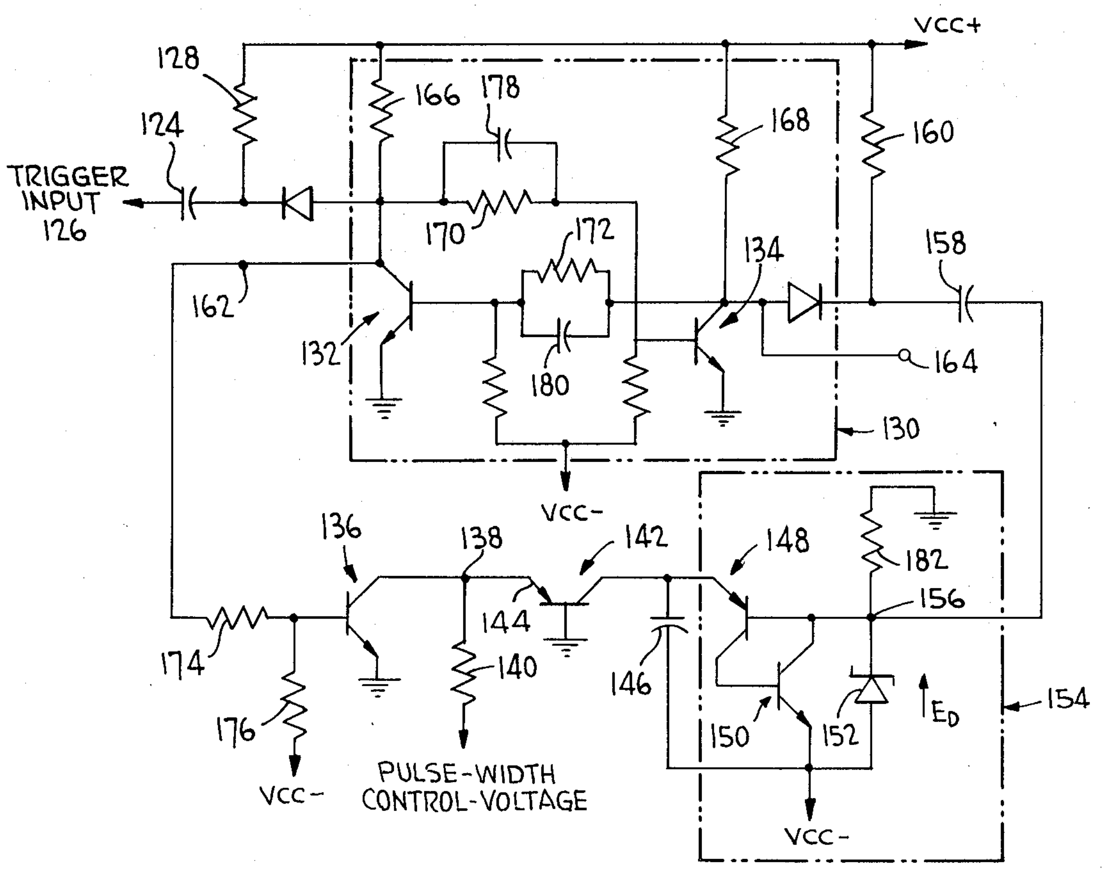
FIG. 3 is a circuit diagram representing a second embodiment of the present invention.

Two particular embodiments of voltage controlled one-shots are illustrated in FIGS. 2 and 3. It is to be pointed out that these voltage controlled multivibrators are preferred embodiments of the claimed invention.

Transistors 50 and 52 comprise a series Schmitt trigger 54 that regenerates when the voltage at 56 rises slightly (by about $V_{BE}$ of transistor 50) above the voltage at point 58. When this occurs, the voltage at point 56 is clamped to about $V_{CC-}$. If sufficient current into point 56 is supplied, the circuit will remain in this clamped condition. This holding current is supplied through resistors 60, 62 and diode 64, as well as by current produced by transistor 66 when a control voltage, $E_{IN}$, exists at the one-shot input 68.

If a control voltage exists and a sufficiently large pulse is applied at the trigger input 70, transistor 72 will divert current flow from transistors 50 and 52 (for a brief time) since the trigger pulse is differentiated by capacitor 74 and resistor 76 releasing the regeneration of transistors 50 and 52. The voltage at 58 then rises too $V_{CC-}+E_D$, and this turns on transistor 78 which removes the holding current that was flowing through resistor 62 and diode 64. Diode 64 acts to block reverse current flow from point 56. Hence, the voltage at point 56 is about $V_{CC-}$ and can be significantly affected only by current from constant current driver 66 unless a second trigger pulse is received to start the cycle from its beginning again. If the emitter of transistor 72 is attached to point 58, the circuit cannot be retriggered during its on-cycle providing the amplitude of the trigger pulse is less than $E_D$ appearing across Zener diode 102. This occurs because the increased voltage at 58 holds transistor 72 in the off state.

In the constant-current circuitry, the $V_{BE}$ of transistor 80 compensates for that of transistor 66. Hence, the constant-current output of transistor 66 is then approximately $E_{IN}$ divided by resistor 82. This current causes capacitor 84 to charge and causes the voltage at 56 to rise in a linear fashion with time. When the voltage at 56 rises above the voltage at 58 by $V_{BE}$ (transistor 50) volts, transistors 50 and 52 again regenerate and start the cycle over again. However, as was mentioned, the cycle can also be initiated by an early trigger pulse.

If the timing goes to completion, the one-shot's output pulse-width T is given by:

$$T=\frac{(E_D+V_{BE50}-V_{SAT52}-V_{BE50})C_{84}}{\text{Constant current}}=\frac{(E_D-V_{SAT52})C_{84}R_{82}}{E_{IN}}$$

which is derived from the equation for the voltage across a capacitor when charged with a constant current for a given period of time, T. Hence, the required reciprocal relationship between one-shot pulse-width and the control voltage is produced.

Considerinig the remaining components of the one-shot illustrated in FIG. 2, resistor 86 is connected between the emitter 88 of transistor 80 and the positive bias supply 90. The resistor 86 serves to properly bias the transistor 80.

A diode 94 is connected in shunt across resistor 76. The purpose of this diode is to D.C. restore the trigger pulses appearing at input 70.

A resistor 98 is connected between point 58 and ground 100. Resistor 98 establishes point 58 at a proper potential that governs the conduction of the Zener diode (which establishes the reference voltage $E_D$). The Zener diode is referenced as 102.

The switching transistor 78 has its collector 104 connected to a coupling resistor 106 that completes a conduction path to the base 108 of an output driving transistor 110. The collector 114 of this transistor is connected to the positive bias source through a load resistor 112. The emitter 116 is directly connected to ground. Upon actuation of the one-shot, an output pulse is produced at the collector output terminal 118 of transistor 110.

The following design considerations are enumerated to more specifically define the components in the circuitry of FIG. 2:

(1) Resistor 82 should be ten times the value of resistor 86, and for best linearity, the current in transistor 66 should be large with respect to its leakage current.

(2) The time constant exhibited by capacitor 74 and resistor 76 should be less than or equal to 10 percent the minimum one-shot pulse time.

(3) Resistors 60 and 62 should be selected to give a holding current which is at least equal to, or greater than $$\frac{V_{CC-}}{R_{98} H_{FE} \text{min. } 52}$$

(4) Resistor 120, which couples point 58 to base 122 of transistor 78 should be large with respect to resistors 98, and resistor 106 should be large with respect to resistor 60. However, resistors 120 and 106 should not be so large that leakage currents become significant in transistors 78 and 110.

Referring to FIG. 3, a second embodiment of the present invention is illustrated. This circuit is also a voltage controlled one-shot which exhibits a reciprocal relationship between the output pulse width and an applied control voltage.

With reference to FIG. 3, a trigger pulse at 126 is differentiated by resistor 128 and capacitor 124. A resultant impulse causes flip-flop 130, made up of transistors 132 and 134 to change state (unless already triggered), causing the collector of transistor 132 to go essentially to ground. This causes transistor 136 to release the junction 138, at resistor 140, and transistor 142 to begin to conduct. Current flows into the emitter 144 of transistor 142 as determined by the equation.

$$I = \frac{\text{Control voltage} - V_{BE142}}{R_{140}}$$

Since transistor 142 is in a constant current configuration, this causes essentially the same current to flow in the collector of transistor 142. Capacitor 146 begins to charge linearly with time until the voltage across it reaches $V_{BE148}$+Zener voltage of diode 152 ($E_D$). Transistors 148 and 150, constitute a series Schmitt trigger 154, regenerate and cause point 156 to drop to about $V_{CC-}$. The resultant negative pulse is then differentiated by capacitor 158 and resistor 160 thus causing the flip-flop 130 to change state. Now the flip-flop can be retriggered to start the cycle all over again.

The length of the resulting one-shot pulse (available at points 162 and 164) is determined by the time taken to charge capacitor 146. This is determined by the expression:

$$T = \frac{(E_D + V_{BE148}) C_{146}}{I_{142}} = \frac{(E_D + V_{BE148}) C_{146} R_{140}}{\text{Control voltage} - V_{BE142}}$$

Since $V_{BE142}$ should be kept small with regard to the control voltage, the required reciprocal relationship for time is achieved.

In order to further specify the components of this embodiment, the following design considerations are offered as a guide:

(1) The time constant of resistor 128 and capacitor 124 as well as resistor 160 and the capacitor 158 should be less than 10 percent of the minimum one-shot pulse width.

(2) Resistor 128 should be no less than the value of resistor 166 that is connected in parallel through a diode with resistor 128 and which serves as a collector resistor for the transistor 132. Further, resistor 160 should be no less than the value of resistor 168. In a similar manner, resistor 168 is connected through a diode across resistor 160 and serves as a collector resistor for transistor 134.

(3) The coupling resistors 170 and 172 serve to connect the collector of transistor 132 to the base of transistor 134 and vice versa. These resistors are selected so that at the smallest $H_{FE}$ of transistors 132 and 134 and worst case power supply situations, the appropriate flip-flop transistors can be turned off and on.

(4) Resistors 174 connects point 162 to the base of transistor 136. A bias resistor 176 connects the base of this transistor to the negative bias potential. The resistors 174 and 176 are selected so that transistor 136 will turn on when point 162 is most positive. Also, resistor 174 should be at least ten times the value of resistor 166 to avoid significant reduction of the output pulse at point 162.

(5) Speed-up capacitors 178 and 180 are connected in parallel with the resistors 170 and 172, respectively. The time constants of capacitor 180, resistor 172 and capacitor 178, resistor 170 should be less than 10 percent of the minimum one-shot pulse width.

(6) Resistor 140 should be selected so that at the minimum control voltage applied to this resistor, the transistor current at transistor 142 is at least ten times the leakage in transistor 142 thereby reducing non-linearity.

(7) Diode 152 should have a Zener voltage ($E_D$) less than or equal to 50 percent of the bias potential $V_{CC-}$.

(8) Resistor 182, connecting the cathode of diode 152 to ground, should be small enough to allow the diode to operate, but not so small that point 156 cannot be pulled to ground at a minimum current through transistor 142 and minimum $H_{FE150}$.

The attendant advantages for both embodiments (FIGS. 2 and 3) include low power consumption, immunity to double triggering, immunity (to some extent) to power supply variations, and compensation for temperature changes.

It should be understood that the invention is not limited to the exact details of construction shown and described herein for obvious modifications will occur to persons skilled in the art.

What I claim is:

1. A voltage controlled monostable multivibrator comprising:

(a) a first input terminal at which a trigger signal appears;

(b) switch means connected to the terminal for changing state in response to the occurrence of the trigger signal;

(c) a second input terminal at which a control voltage appears;

(d) means connected to the second terminal for generating a constant current;

(e) charging means connected to the constant current means for developing a voltage across the charging means;

(f) a series Schmitt trigger including two transistors, the collector of the first transistor connected to the base of the second transistor, the base of the first transistor connected to the collector of the second transistor, and the emitters of both transistors connected across the charging means for producing regeneration in the transistors when a preselected voltage difference develops between the voltage across the charging means and the collector-emitter junction of the second transistor;

(g) diode means connected across the collector-emitter junction of the second transistor to establish a reference voltage thereacross;

(h) simultaneous application of the control voltage at the second input terminal and the trigger signal at the first input terminal changing the state of the switch means to produce a one-shot output signal therefrom with its pulse width being related reciprocally to the control voltage.

2. The circuitry set forth in claim 1 wherein the charging means comprises a capacitor for charging linearly in response to being fed by the constant current means.

3. The subject matter set forth in claim 2 wherein the diode means is a Zener diode for establishing the reference voltage that must be exceeded by the voltage across the capacitor as a condition for regeneration by the series Schmitt trigger.

UNITED STATES PATENTS

References Cited

| | | | |
|---|---|---|---|
| 3,569,743 | 3/1971 | Baessler | 307—273 |
| 3,651,345 | 3/1972 | Lundgreen | 307—273 |
| 3,376,431 | 4/1968 | Merrell | 307—293 X |
| 3,644,754 | 2/1972 | Dosch | 307—324 X |
| 3,282,631 | 11/1966 | Mosinski | 307—293 |
| 3,389,296 | 6/1968 | Carruth | 307—293 X |
| 3,436,682 | 4/1969 | Birnbaum | 307—273 X |
| 3,480,801 | 11/1969 | Smith | 307—273 X |
| 3,497,725 | 2/1970 | Lorditch | 307—273 |

OTHER REFERENCES

"Adjustable Pulse Width Single-Shot," by Moser in IBM Tech Disclosure Bulletin, vol. 8, No. 5, October 1965, p. 817, 307–273.

"Monostable Multivibrator," by Dorsey in RCA Tech Notes, RCA TN No. 658, November 1965, 307–273.

STANLEY D. MILLER, JR., Primary Examiner

U.S. Cl. X.R.

128—2.05 T, 2.06 A; 307—265; 328—207